Patented Jan. 8, 1935

1,987,121

UNITED STATES PATENT OFFICE 1,987,121

PROCESS OF MAKING ALKOXYACETIC ACIDS

Carl J. Malm and Gale F. Nadeau, Rochester, N. Y., assignors to Eastman Kodak Company, Rochester, N. Y., a corporation of New York No Drawing. Application September 18, 1933, Serial No. 689,895

5 Claims. (Cl. 260—112)

This invention relates to the manufacture of alkoxy acetic acids, such, for instance, as methoxy acetic acid, ethoxy acetic acid, etc. An object of our invention is to provide a process for making alkoxy acetic acids safely, conveniently, and in good yields. Another object of our invention is to provide a process of making alkoxy acetic acids which will permit of easy recovery of the chemicals which are not used up in the reaction. Other objects will hereinafter appear.

Alkoxyacetic acids have hitherto been prepared by treating an alcohol solution of monochloroacetic acid with a sodium alcoholate. Sodium alcoholate is commonly prepared by dissolving metallic sodium in alcohol. This operation must be carried out slowly, and is of a dangerous character. Furthermore, metallic sodium is expensive, and difficult and dangerous to handle. It is possible to prepare sodium alcoholate from sodium hydroxide and alcohol, but the yield of alkoxy acetic acid obtained when the sodium alcoholate is prepared in this manner is relatively low. Furthermore, the recovery of the chemicals not used up in the reaction is difficult.

We have discovered that alkoxy acetic acids, such, for example, as methoxy acetic acid and ethoxy acetic acid, can be prepared from the alkyl esters of monochloroacetic acid and barium alcoholates. Dangerous operations are not involved, the reaction runs smoothly and with good yield, and the unreacted chemicals can be easily and economically recovered.

By way of example, we shall describe the preparation of methoxy acetic acid by our process. It will be understood, however, that the process is applicable to the preparation of ethoxy acetic acid and the other lower alkoxy acetic acids, ethyl alcohol or other lower alkyl alcohol being substituted for methanol, and the corresponding alkyl mono-chloroacetate for methyl monochloroacetate.

In the preparation of methoxy acetic acid by our novel process, barium oxide is first dissolved in a large excess of methanol to form barium methylate (Equation 1 below). For instance, 2000 grams of barium oxide may be added to 8 liters of methanol. This solution is heated to boiling, whereupon methyl monochloroacetate is added very slowly to the boiling solution, the barium methylate being maintained in excess. For instance, to the above solution of barium methylate, we may slowly add 770 grams of methyl monochloroacetate, to form methyl methoxy acetate (Equation 2). When the reaction is over, water is added to the reaction mixture, 2 liters being a suitable amount to add if the above quantities of reagents have been used. The excess methanol is then distilled off. During this distillation the methyl methoxy acetate is hydrolyzed by the excess barium hydroxide to give barium methoxy acetate and methanol (Equation 3), the methanol distilling off with that already present. The reaction mixture is then acidified with hydrochloric acid to give methoxy acetic acid (Equation 4), which is extracted with an organic solvent, such as ethyl ether or cyclohexanone, and purified by distillation. In a laboratory experiment the yield was 85% of theory.

The reactions taking place in the above example may be represented by the following equations:

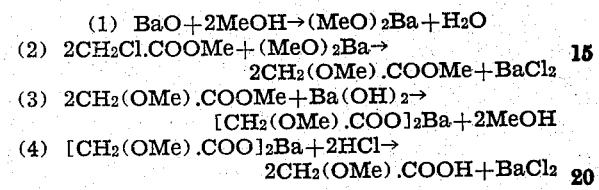

The recovered methanol can be used in subsequent batches. If it is not desired to recover the alcohol, it is not necessary that the ester of chloroacetic acid used be that corresponding to the alcohol employed. The barium oxide can be recovered by precipitation of the barium compounds as barium carbonate, followed by roasting.

It will be understood that the example given is purely illustrative, and that we are not to be limited thereby except as indicated in the appended claims.

While we have described the process as applied to the manufacture of alkoxy acetic acids, it will be obvious that it is likewise applicable to the manufacture of other alkoxy fatty acids, such, for instance, as alkoxy propionic acids, etc.

What we claim as our invention and desire to be secured by Letters Patent of the United States is:

1. A process of preparing an alkoxy fatty acid which comprises reacting a barium alcoholate with an alkyl ester of a monochloro fatty acid.

2. A process of preparing an alkoxy acetic acid which comprises reacting a barium alcoholate with an alkyl ester of monochloroacetic acid.

3. A process of preparing methoxy acetic acid which comprises reacting barium methylate with methyl monochloroacetate.

4. A process of preparing ethoxy acetic acid which comprises reacting barium ethylate with ethyl monochloroacetate.

5. A process of preparing an alkoxy acetic acid which comprises reacting a barium alcoholate with an alkyl ester of monochloroacetic acid, hydrolyzing the alkyl alkoxy acetate formed to barium alkoxy acetate, and liberating the alkoxy acetic acid.

CARL J. MALM.
GALE F. NADEAU.